Aug. 26, 1941.    W. Q. WATTERSON    2,253,877
AUTOMATIC TRANSMISSION
Filed Jan. 24, 1941    3 Sheets-Sheet 1

Inventor
Wilfred Quayle Watterson
By Clarence A. O'Brien
Attorney

Aug. 26, 1941.    W. Q. WATTERSON    2,253,877
AUTOMATIC TRANSMISSION
Filed Jan. 24, 1941    3 Sheets-Sheet 2

Inventor
Wilfred Quayle Watterson

By *Clarence A. O'Brien*

Attorney

Aug. 26, 1941.  W. Q. WATTERSON  2,253,877
AUTOMATIC TRANSMISSION
Filed Jan. 24, 1941   3 Sheets-Sheet 3

Inventor
Wilfred Quayle Watterson

By

Attorney

Patented Aug. 26, 1941

2,253,877

UNITED STATES PATENT OFFICE 2,253,877

AUTOMATIC TRANSMISSION

Wilfred Quayle Watterson, South Pasadena, Calif., assignor to Kenneth Lynn Frazier, San Gabriel, Calif.

Application January 24, 1941, Serial No. 375,853

4 Claims. (Cl. 192—60)

This invention relates to new and useful improvements in transmissions for use on automotive, stationary and marine installations.

The principal object of the present invention is to provide an automatic transmission which will eliminate the usual clutch mechanism and which will be substantially automatic in operation in all respects.

Another important object of the invention is to provide a transmission which is capable of building up torque to suit any load conditions and transmitting it smoothly in correct proportion to the engine speed and load.

Other objects and advantages of the invention will become apparent to the reader of the following description.

In the drawings:

Figure 5 is a sectional view taken substantially on the line 5—5 of Figure 1.

Figure 8 is a perspective view of one of the pitmans.

Figure 1:
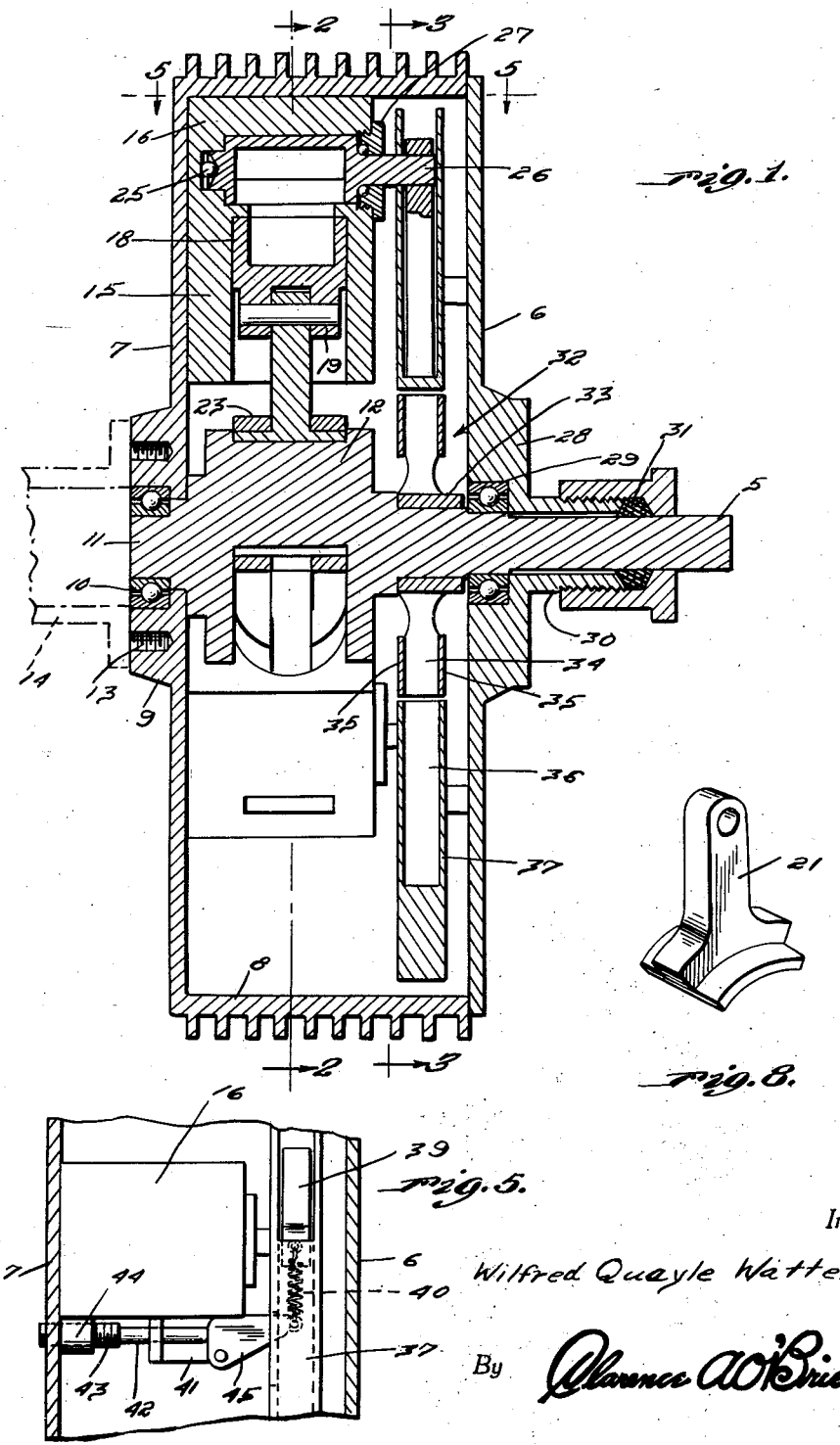
Figure 1 represents a longitudinal sectional view through the transmission.
Figure 2:
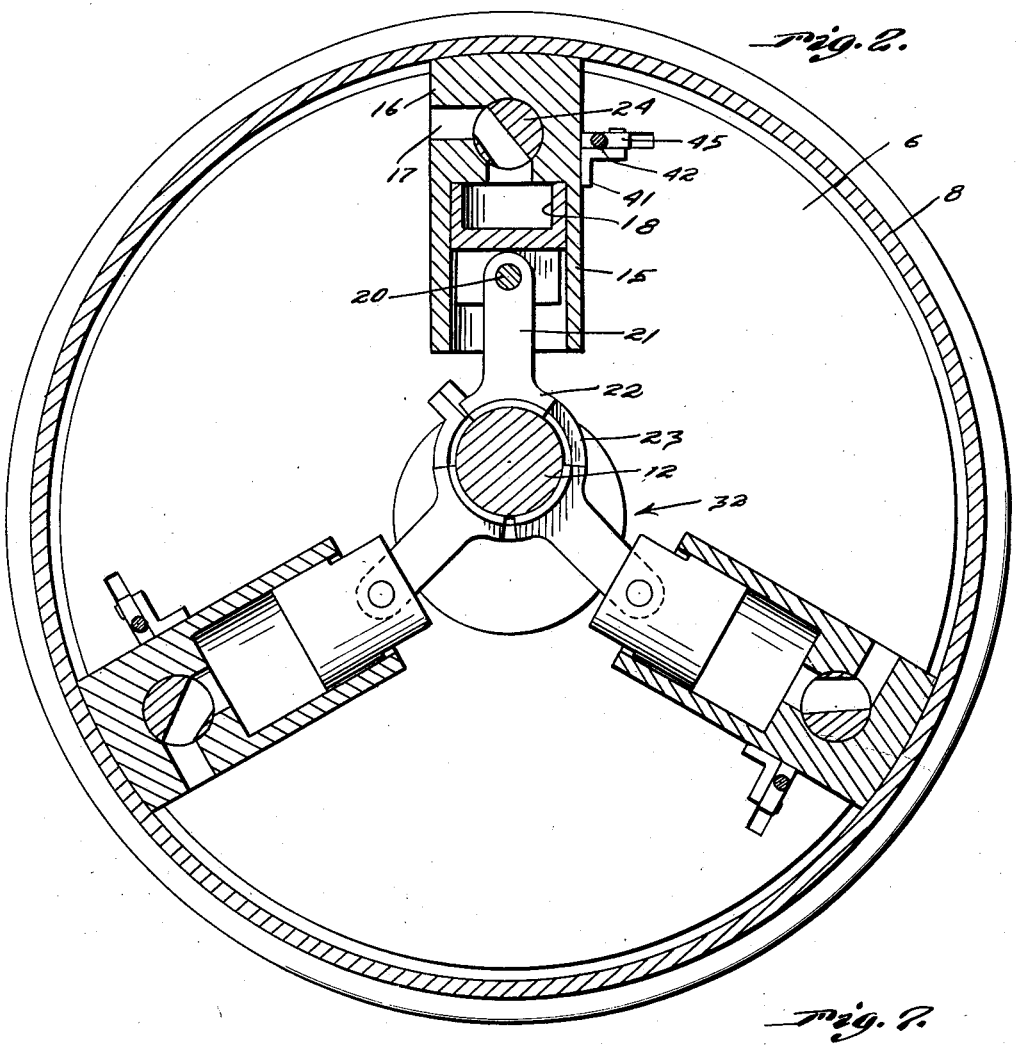
Figure 2 is a transverse vertical sectional view taken substantially on the line 2—2 of Figure 1.
Figure 7:
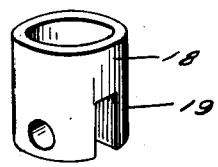
Figure 7 is a perspective view of one of the pistons.
Figure 6:
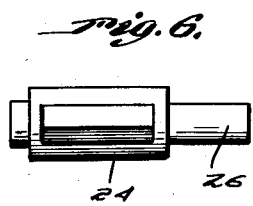
Figure 6 is a plan view of one of the rotary valves.
Figure 3:
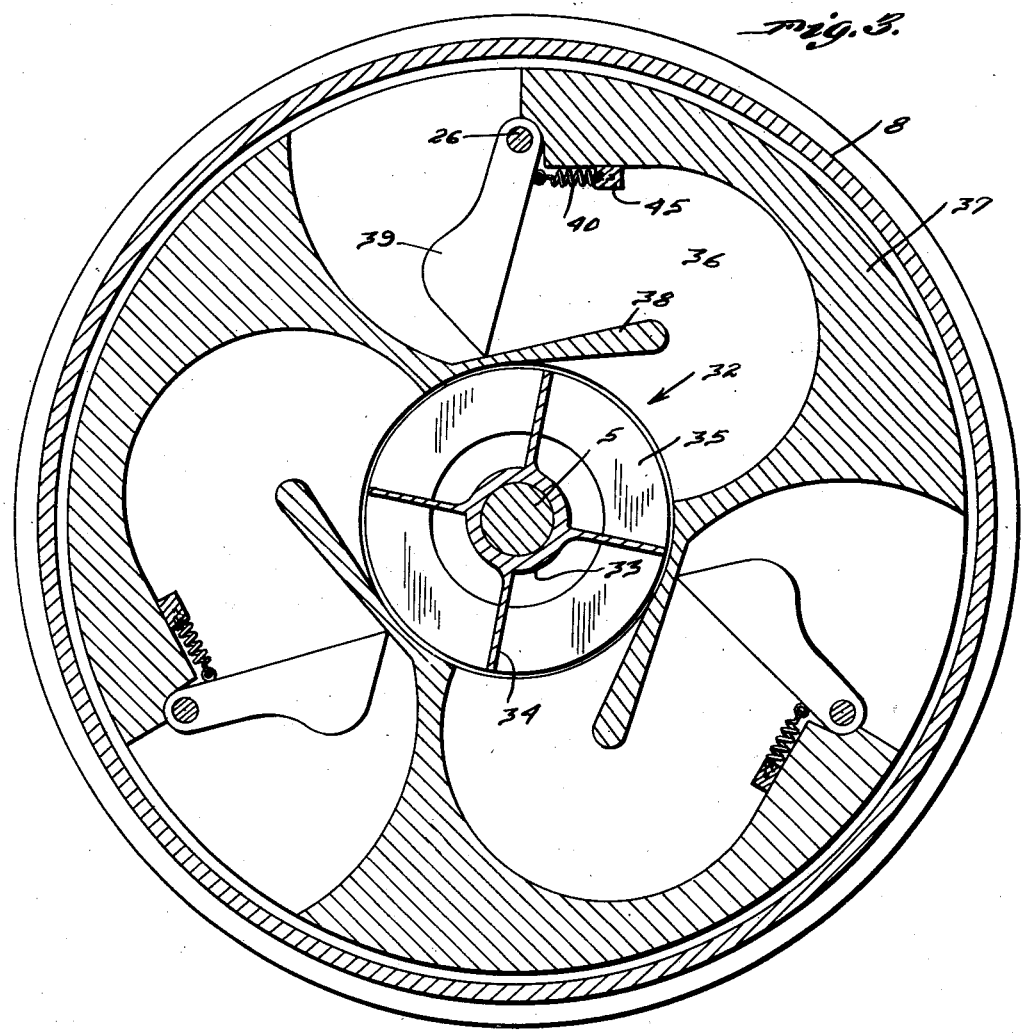
Figure 3 is a transverse vertical sectional view taken substantially on the line 3—3 of Figure 1.
Figure 4:
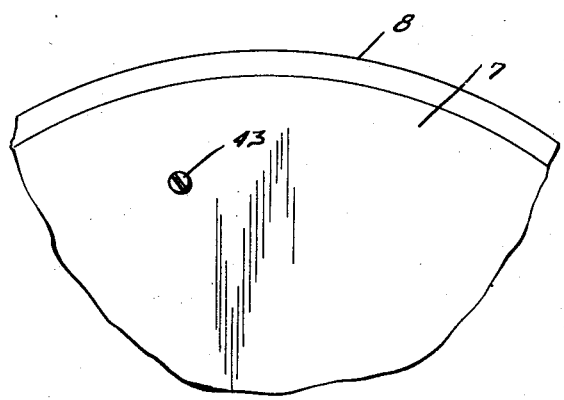
Figure 4 is a fragmentary elevational view of the front portion of the transmission.

Referring to the drawings wherein like numerals designate like parts, it can be seen that numeral 5 denotes a drive shaft which can be suitably connected with the driving motor. The transmission includes a shell consisting of a removable front wall 6, a rear wall 7 and a circumferential wall 8. The central portion of the rear wall 7 has a boss formation 9 containing a bearing assembly 10 for the stub shaft extension 11 of a crank 12. This boss formation 9 has threaded openings 13 therein for receiving machine screws employed in attaching a driven shaft 14.

Carried by the inside of the rear wall 7 and the circumferential wall 8 are radially disposed cylinders 15, each of which has a head 16 through which an L-shaped passageway 17 extends communicating the interior of the cylinder 15 with the interior of the transmission housing. In each of the cylinders 15 is a piston 18, the same having a bifurcated skirt 19 apertured to receive a wrist pin 20, this pin extending through the outer end of a corresponding pitman 21. The inner ends of these pitmans 21 are provided with laterally flanged heads 22 and rings 23 are provided on the crank and around the flanges of the heads 22 to prevent displacement of the heads.

At each of the cylinder heads 16 and interrupting the passageway 17 thereof, is a rotary valve 24. Each of these rotary valves has suitable bearing means 25 and is provided with a stub shaft 26 extending from one end thereof and through one side of the head 16 in a forward direction. These rotary valves are located in bores of the cylinder head 16 and are held in place by nuts 27.

As can be seen in Figure 1, the removable plate 6 of the transmission housing has a boss 28 at its forward side, containing a bearing assembly 29 through which the driving shaft 5 extends. This boss 28 has a forwardly projecting barrel 30 terminating in a packing gland 31 receiving the driving shaft 5.

The crank 12 is mounted at the rear end of the driving shaft 5 and within the transmission housing. A pump impeller generally referred to by numeral 32 is provided in the transmission housing just forwardly of the crank 12 and this consists of a hub 33 suitably secured to the driving shaft 5 and provided with a plurality of radially disposed blades 34. A pair of annular side walls 35 are secured to opposite side edges of the blades 34 and have their inner edges spaced from the hub 33. As the interior of the transmission contains a considerable volume of oil or other suitable fluid, fluid caught within the confines of the blades 34 as the impeller 32 is rotating, is thrown outwardly and into the substantially S-shaped passageways 36 of the control. The S-shaped passageways are formed in a fixed annulus 37 which circumscribes the impeller 32. Deflectors 38 extend into the passageways 36 for a purpose which will be hereinafter more fully set forth.

Operating arms 39 are mounted across the passageways 36 and each is provided with a spring 40 which serves to swing the arm 39 to abut its corresponding deflector 38. Each of these arms 39 is suitably keyed or otherwise secured to its corresponding rotary valve stub 26.

As can be seen in Figure 5 each cylinder head 16 has a bracket 41 mounted at the side thereof and through this is feedable a pin 42. The pin 42 has a threaded portion 43 which extends through a nut or internally threaded member 44. This threaded portion 43 extends through the rear side 7 of the transmission housing. Also mounted on the bracket 41 is a triangular-shaped plate 45 against which the pin 42 is movable to swing the plate 45. As the corresponding spring 40 is attached to the forwardmost portion of the plate 45, in which driving of the pin 42 will result in the swinging of the plate 45 to increase the tension of said spring.

The speed ratios between the driving shaft and the driven shaft are infinite. The speed at which the direct ratio is reached is controlled by the speed of the driven shaft. This speed is variable and can be adjusted to suit any particular condition. However, adjustments cannot be made while the device is in motion.

The following describes the cycle of events taking place in the unit when power or torque is applied to the driving shaft 5: As previously stated, the rotary valves 24 are spring held, and each one is adjusted so that the tension maintained will automatically change the speed at which the 1 to 1 ratio will become effective. Also, the engine crankshaft 12 and the driving shaft 5 of the unit are directly connected to each other and therefore rotate at the same number of R. P. M. When the unit is at rest, the hydraulically balanced rotary valves are held in their wide open position by springs 40 acting on the control arms 39. In this position, the hydraulic fluid is permitted to pass back and forth from the piston heads 16 to the main fluid chamber without restriction.

The engine is started and allowed to run at idling speed. Hydraulic fluid in the unit is now put in circulation by the pump impeller 32 and at the same time the pistons are free to move in their respective cylinders, because at low engine speed, the pump impeller does not impart enough kinetic energy to the fluid to operate the control arms. Since no restriction is placed on the hydraulic fluid above the pistons, no torque is transmitted to the driven side of the unit, and the so-called "neutral" position is maintained.

As engine speed is increased, the fluid circulated by the pump impeller strikes the control arms with enough force to cause them to move outwardly toward the rim of the case and in doing so, the rotary valves are partially closed. This partial closing causes an impediment in the flow of the fluid between the cylinders and the fluid chamber. This restriction in turn causes the cylinder blocks, which are directly connected to the driven shaft and free to rotate around the driving shaft, to be moved ahead in the same direction as the driving shaft. The speed at which the driven shaft is rotated depends upon three factors: namely, engine R. P. M., load on driven shaft, and speed of driven shaft.

As the speed of the engine increases, the rotary valves continue to close, thereby causing the flow of fluid between the cylinders and the main fluid chamber to become more restricted, which in turn causes the speed of the driven shaft 14 to increase.

The driven shaft with its attached cylinder blocks and control arms rotate as a unit, and as its speed increases, the relative speed between the pump impeller and the control arms decreases with the attendant falling off of kinetic energy transmitted by the circulating fluid to the control arms. However, when this speed is reached, centrifugal force acting on the weighted control arms is now great enough to force them outwardly to the limit of their arc, and when this limit is reached, the rotary valves are completely closed preventing the pistons from moving in their respective cylinders, thereby locking the entire unit in the 1 to 1 ratio. The speed at which the 1 to 1 ratio becomes effective is controlled by the tension of the springs attached to the control arms, and the unit remains locked in direct drive for all speeds above this point.

From the above, it will be seen that it is impossible for a vehicle to get out of control on grades where the motor is used as a brake, because when the vehicle reaches the predetermined speed setting of the control arms, the unit automatically locks itself in direct drive. Also it is impossible to make a rough start because the unit transmits the power steadily and evenly in proportion to the load.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A transmission comprising a housing, a driven shaft extending from the housing, a drive shaft extending into the housing and provided with a crank at the housing end thereof, cylinders carried by the housing, pistons operative in the cylinders, pitmans connected to the pistons and being operatively associated with the crank, passageways in the heads of the cylinders communicating the interiors of the cylinders with the interior of the housing, rotary valves traversing the passageways, a fluid impeller carried by the drive shaft and at the inside of the housing, a control structure surrounding the impeller and having a plurality of passageways extending outwardly therethrough and control arms in the passageways of the control structure operatively connected with the valves.

2. A transmission comprising a housing, a driven shaft extending from the housing, a drive shaft extending into the housing and provided with a crank at the housing end thereof, cylinders carried by the housing, pistons operative in the cylinders, pitmans connected to the pistons and being operatively associated with the crank, passageways in the heads of the cylinders communicating the interiors of the cylinders with the interior of the housing, rotary valves traversing the passageways, a fluid impeller carried by the drive shaft and at the inside of the housing, a control structure surrounding the impeller and having a plurality of passageways extending outwardly therethrough and control arms in the passageways of the control structure operatively connected with the valves, and fluid deflectors in the passageways of the control structure.

3. A transmission comprising a housing, a driven shaft extending from the housing, a drive shaft extending into the housing and provided with a crank at the housing end thereof, cylinders carried by the housing, pistons operative in the cylinders, pitmans connected to the pistons and being operatively associated with the crank, passageways in the heads of the cylinders communicating the interiors of the cylinders with the interior of the housing, rotary valves traversing the passageways, a fluid impeller carried by the drive shaft and at the inside of the housing, a control structure surrounding the impeller and having a plurality of passageways extending outwardly therethrough and control arms in the passageways of the control structure operatively connected with the valves, and regulating means for the said arms.

4. A transmission comprising a housing, a driven shaft extending from the housing, a drive shaft extending into the housing and provided with a crank at the housing end thereof, cylinders carried by the housing, pistons operative in the cylinders, pitmans connected to the pistons and being operatively associated with the crank, passageways in the heads of the interior of the housing, rotary valves traversing the passageways, a fluid impeller carried by the drive shaft and at the inside of the housing, a control structure surrounding the impeller and having a plurality of passageways extending outwardly therethrough and control arms in the passageways of the control structure operatively connected with the valves, and spring tensioning means for the arms and means for adjusting the tension of the spring means.

WILFRED QUAYLE WATTERSON.